(12) United States Patent
Seo

(10) Patent No.: US 8,837,391 B2
(45) Date of Patent: Sep. 16, 2014

(54) METHOD OF REQUESTING RADIO RESOURCE IN WIRELESS COMMUNICATION SYSTEM

(75) Inventor: Han Byul Seo, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 13/061,614

(22) PCT Filed: Sep. 1, 2009

(86) PCT No.: PCT/KR2009/004898
§ 371 (c)(1), (2), (4) Date: Mar. 1, 2011

(87) PCT Pub. No.: WO2010/027175
PCT Pub. Date: Mar. 11, 2010

(65) Prior Publication Data
US 2011/0164587 A1    Jul. 7, 2011

Related U.S. Application Data

(60) Provisional application No. 61/093,780, filed on Sep. 3, 2008.

(30) Foreign Application Priority Data

Oct. 9, 2008  (KR) .................. 10-2008-0098907

(51) Int. Cl.
| | | |
|---|---|---|
| *H04W 4/00* | (2009.01) | |
| *H04W 76/02* | (2009.01) | |
| *H04L 1/18* | (2006.01) | |
| *H04L 1/16* | (2006.01) | |
| *H04W 72/04* | (2009.01) | |
| *H04W 28/04* | (2009.01) | |

(52) U.S. Cl.
CPC ......... *H04L 1/1671* (2013.01); *H04W 72/0413* (2013.01); *H04W 76/027* (2013.01); *H04L 1/1825* (2013.01); *H04L 1/188* (2013.01); *H04W 28/04* (2013.01)
USPC ........................... 370/329; 370/436; 370/450

(58) Field of Classification Search
CPC ............ H04M 2215/32; H04M 15/00; H04M 15/745; H04M 15/90; H04M 2215/0108
USPC ........ 370/328, 329, 331; 455/435.1, 436, 450
See application file for complete search history.

(56) References Cited

U.S. PATENT DOCUMENTS

| | | | |
|---|---|---|---|
| 6,278,712 B1* | 8/2001 | Takihiro et al. | 370/400 |
| 2001/0018342 A1 | 8/2001 | Vialen et al. | |
| 2005/0020272 A1* | 1/2005 | Barve | 455/450 |
| 2007/0249351 A1* | 10/2007 | An et al. | 455/436 |

(Continued)

FOREIGN PATENT DOCUMENTS

| | | |
|---|---|---|
| KR | 10-2006-0062966 | 6/2006 |
| WO | WO 2007/078155 A2 | 7/2007 |

* cited by examiner

*Primary Examiner* — Jung Park
(74) *Attorney, Agent, or Firm* — Morgan, Lewis & Bockius LLP

(57) ABSTRACT

A method of requesting a radio resource in a wireless communication system is provided. The method comprises setting a timer's expiry time, transmitting a radio resource request message to a base station, starting the timer and retransmitting the radio resource request message to the base station if a radio resource allocation message is not received until the timer expires, wherein the expiry time may be set variably based on a communication state.

1 Claim, 6 Drawing Sheets

METHOD OF REQUESTING RADIO RESOURCE IN WIRELESS COMMUNICATION SYSTEM

The present application is a national stage of PCT International Application No. PCT/KR2009/004898, filed Sep. 1, 2009, and claims the benefit of U.S. Provisional Application No. 61/093,780, filed Sep. 3, 2008. The present national stage application also claims the benefit of Korean Patent Application No. 10-2008-0098907, filed Oct. 9, 2008.

TECHNICAL FIELD

The present invention relates to wireless communications, and more particularly, to a method of requesting an uplink radio resource in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

An orthogonal frequency division multiplexing (OFDM) system capable of reducing inter-symbol interference with a low complexity is taken into consideration as one of post-third generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When the UE intends to transmit uplink data, the UE requests a base station (BS) to allocate a radio resource. A method of requesting the radio resource allocation by the UE includes a scheduling request (SR), a buffer status report (BSR), a random access, etc. In general, when a radio resource is allocated to the UE by the BS within a predetermined time, uplink data can be transmitted by the allocated radio resource.

FIG. 1 is a flowchart showing an example of an uplink data transmission process.

Referring to FIG. 1, when a UE intends to transmit uplink data, the UE transmits a radio resource request message to a BS (step S100) and starts a timer (step S110). The timer is for receiving a radio resource allocation message from the BS in response to the radio resource request message.

The UE receives the radio resource allocation message from the BS before the timer expires (step S120), and transmits uplink data based on a radio resource's location and amount included in the radio resource allocation message (step S130). If the UE fails to receive the radio resource allocation message until the timer expires, the UE determines that the radio resource request has failed, and repeats the radio resource request process of step S100 and step S110.

In FIG. 1, if the timer's expiry time is set to be shorter than necessary, the UE may promptly determine that the radio resource request has failed and thus the radio resource request process may be unnecessarily repeated. Otherwise, if the timer's expiry time is set to be longer than necessary, it takes a significantly long time for the UE to determine the failure of the radio resource request, resulting in a problem of time delay.

Accordingly, there is a need for a method of properly setting the timer's expiry time so that the UE receives the radio resource allocation message of the BS in response to the radio resource request message of the UE.

DISCLOSURE OF INVENTION

Technical Problem

The present invention provides a method of properly setting a timer's expiry time in a process of requesting and allocating a radio resource. In particular, the present invention provides a method of properly setting a timer's expiry time according to a situation.

Solution to Problem

According to an aspect of the present invention, a method of requesting a radio resource in a wireless communication system, the method comprises setting a timer's expiry time, transmitting a radio resource request message to a base station, starting the timer and retransmitting the radio resource request message to the base station if a radio resource allocation message is not received until the timer expires, wherein the expiry time may be set variably based on a communication state.

According to an aspect of the present invention, a method of allocating a radio resource in a wireless communication system, the method comprises receiving a radio resource request message from a user equipment, setting a timer's expiry time based on communication state and reporting the expiry time to the user equipment, wherein the expiry time is used for the user equipment to retransmit the radio resource request message if the user equipment fails to receive a radio resource allocation message by the expiry time.

According to an aspect of the present invention, a method of allocating a radio resource in a wireless communication system, the method comprises receiving a radio resource request message comprising information on a timer's expiry time from a user equipment, determining whether the expiry time is properly set, resetting the expiry time if it is determined that the expiry time is not properly set and reporting the reset expiry time to the user equipment, wherein the expiry time is used for the user equipment to retransmit the radio resource request message if the user equipment fails to receive a radio resource allocation message by the expiry time.

According to an aspect of the present invention, a user equipment comprises a processor and a radio frequency (RF) unit which is connected to the processor and transmits/receives a radio signal, wherein the processor is configured for setting a timer's expiry time, transmitting a radio resource request message to a base station, starting the timer and retransmitting the radio resource request message to the base station if a radio resource allocation message is not received until the timer expires, wherein the expiry time may be set variably based on a communication state.

Advantageous Effects of Invention

A user equipment can adaptively set a timer used in a radio resource request process.

Accordingly, a radio resource can be prevented from being repetitively requested by the user equipment, and a time delay generated in a processing of requesting and allocating the radio resource can be reduced.

MODE FOR THE INVENTION

Figure 1:
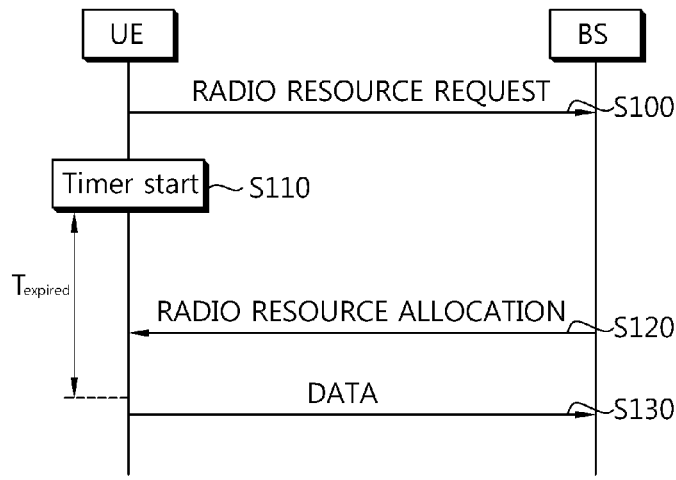
FIG. 1 is a flowchart showing an example of an uplink data transmission process.
Figure 2:
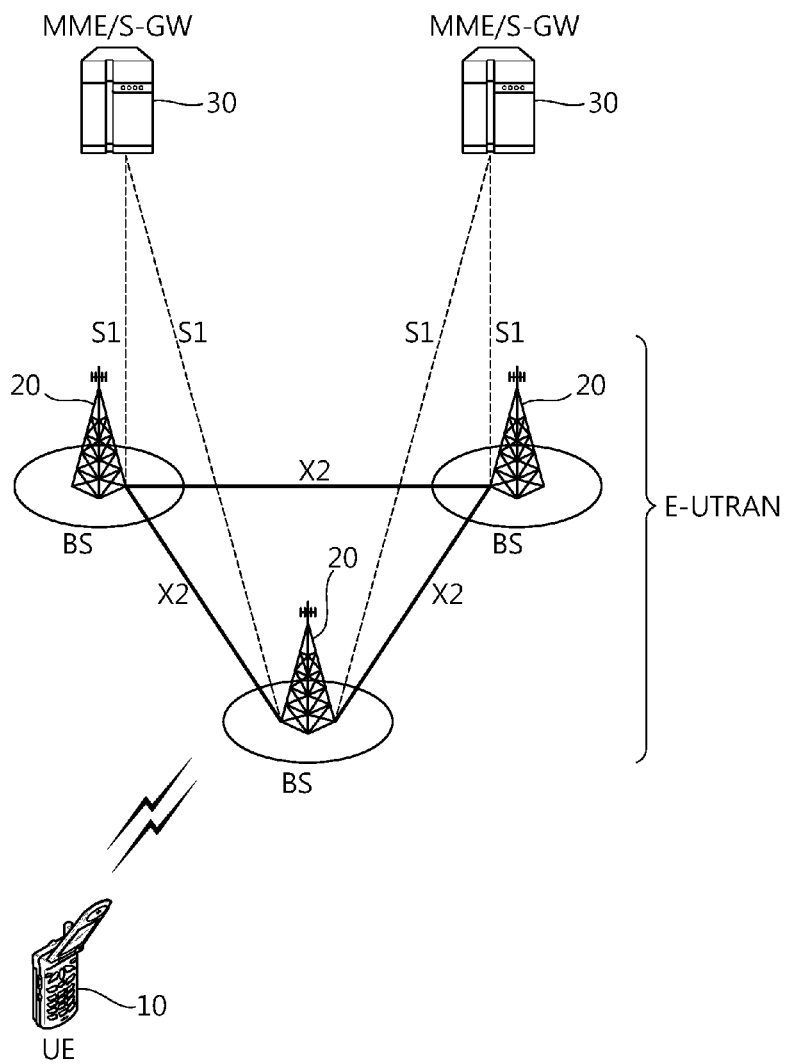
FIG. 2 shows a structure of a wireless communication system.

FIG. 2 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 2, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is a region in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 3:
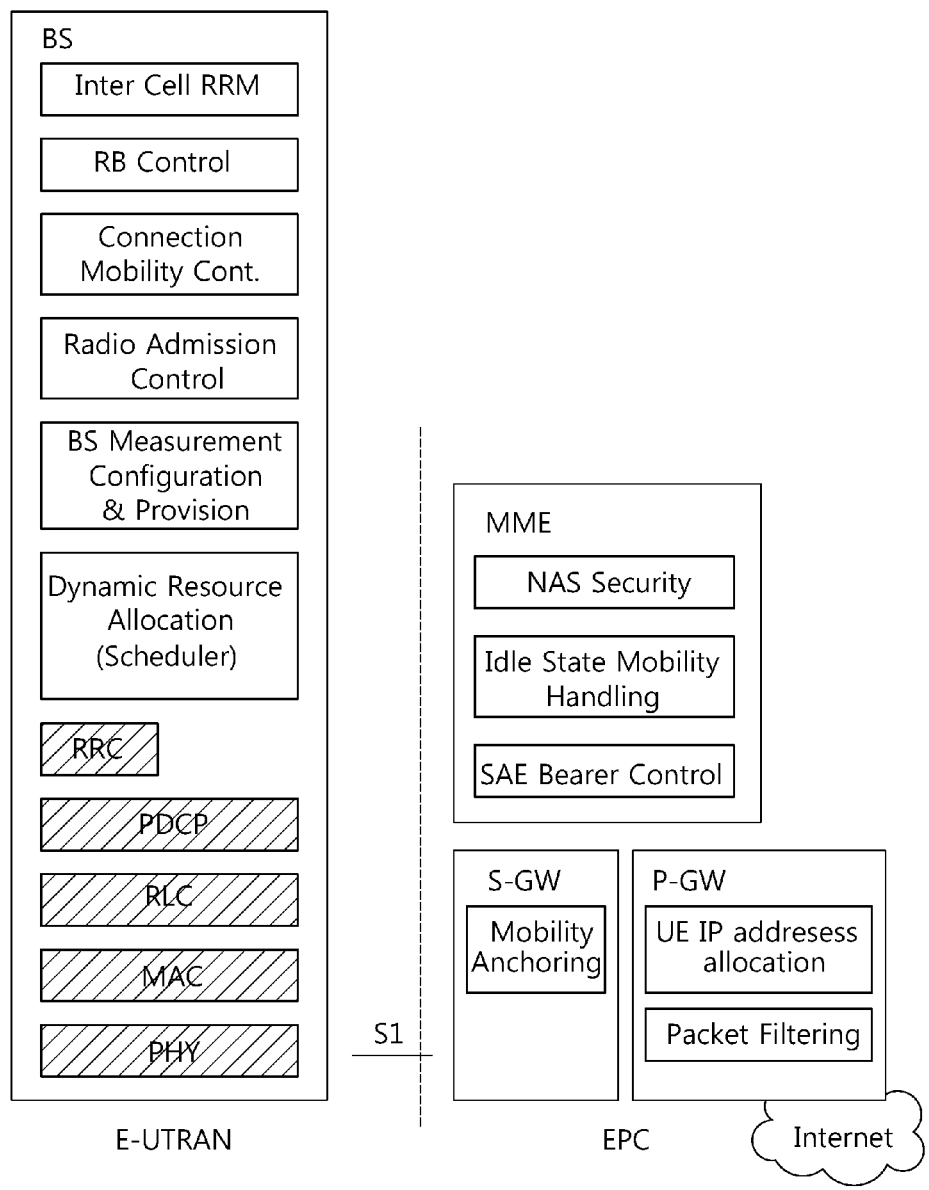
FIG. 3 is a diagram showing functional split between an evolved universal terrestrial radio access network (E-UTRAN) and an evolved packet core (EPC).

FIG. 3 is a diagram showing functional split between the E-UTRAN and the EPC. In FIG. 3, slashed boxes indicate radio protocol layers and white boxes indicate functional entities of the control plane.

Referring to FIG. 3, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 4:
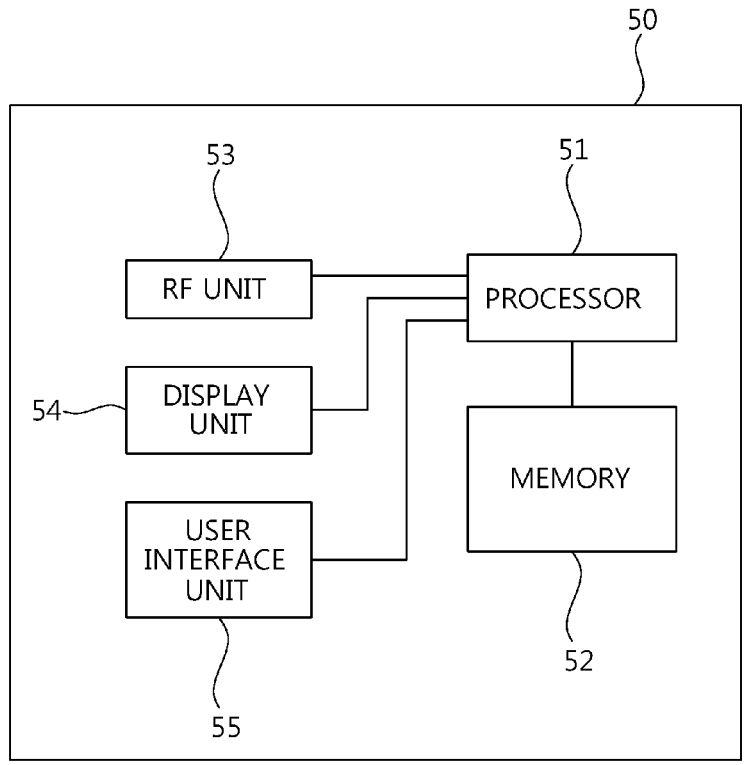
FIG. 4 is a block diagram showing constitutional elements of a user equipment.

FIG. 4 is a block diagram showing constitutional elements of the UE. Referring to FIG. 4, a UE 50 includes a processor 51, a memory 52, a radio frequency (RF) unit 53, a display unit 54, and a user interface unit 55. Layers of a radio interface protocol are implemented in the processor 51. The processor 51 provides the control plane and the user plane. A function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical (PHY) layer belongs to the first layer and provides an information transfer service through a physical channel. A radio resource control (RRC) layer belongs to the third layer and serves to control radio resources between the UE and the network. The UE and the network exchange RRC messages via the RRC layer.

Figure 5:
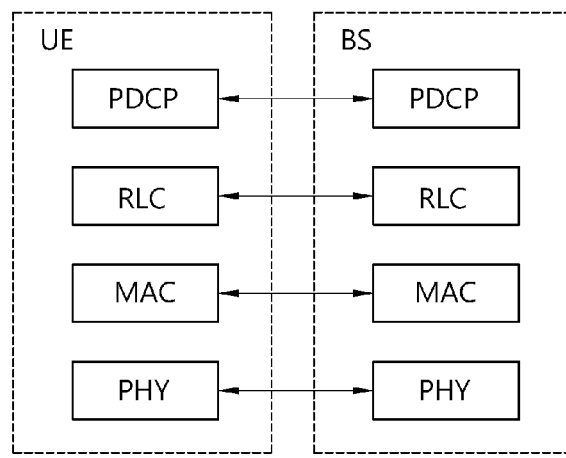
FIG. 5 is a diagram showing a radio protocol architecture for a user plane.
Figure 6:
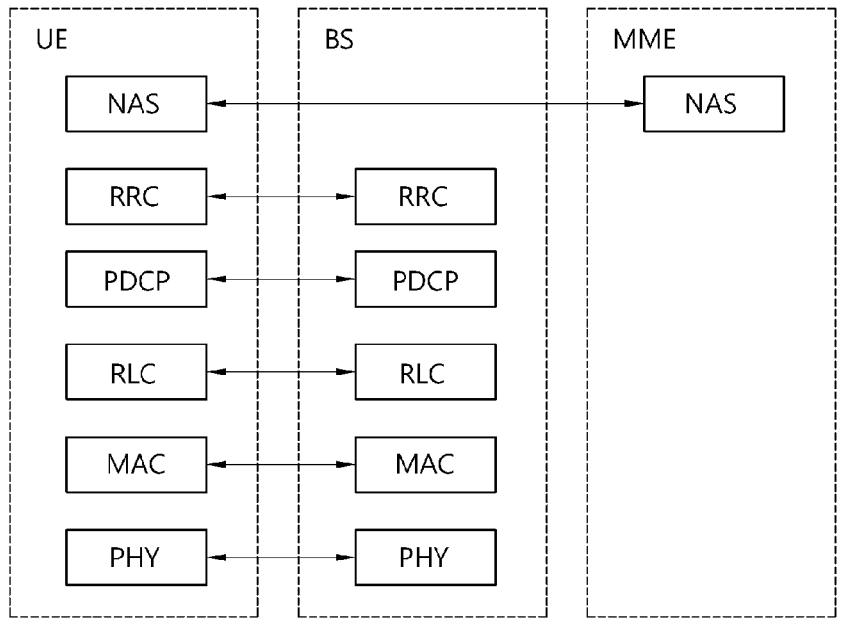
FIG. 6 is a diagram showing a radio protocol architecture for a control plane.

FIG. 5 is a diagram showing a radio protocol architecture for the user plane. FIG. 6 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 5 and 6, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC PDU fails.

A packet data convergence protocol (PDCP) layer belongs to the second layer and performs a header compression function.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 7:
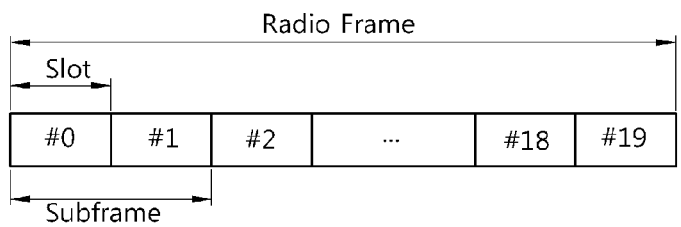
FIG. 7 shows a structure of a radio frame.

FIG. 7 shows a structure of a radio frame.

Referring to FIG. 7, the radio frame consists of 10 subframes, and one subframe consists of two slots. A time for transmitting one subframe is defined as a transmission time interval (TTI). For example, one subframe may have a length of 1 millisecond (ms), and one slot may have a length of 0.5 ms.

The structure of the radio frame is for exemplary purposes only, and thus the number of subframes included in the radio frame or the number of slots included in the subframe, and the number of OFDM symbols included in the slot may change variously.

Hereinafter, a method will be described in which a UE requests a BS to allocate a radio resource when the UE intends to transmit uplink data. The radio resource request may be a scheduling request, a bandwidth request, a resource request, etc.

A first example of a method in which the UE requests the BS to allocate the radio resource is a scheduling request (SR). In particular, the SR is for requesting an uplink shared channel (UL-SCH) resource. The UE transmits the SR to the BS, and starts a timer. In response to the SR, the BS transmits to the UE a grant message to allocate the UL-SCH resource for data transmission. Upon receiving the grant message before the timer expires, the UE transmits uplink data by the allocated UL-SCH resource.

A second example of the method in which the UE requests the BS to allocate the radio resource is a buffer status report (BSR). The BSR is for providing the BS with information on an amount of data stored in a buffer of the UE. The BSR may include information on a priority of uplink data to be transmitted, information on an amount of data occupying the buffer, etc. In general, the UE transmits a regular BSR to the BS, and starts a BSR timer. The BS allocates a limited amount of radio resources to the UE before the BSR timer expires. After the expiry of the BSR timer, the UE transmits to the BS a periodic BSR including information on a buffer occupancy (BO). The BS allocates the radio resource to the UE based on the BO.

A third example of the method in which the UE requests the BS to allocate the radio resource is a random access procedure. The UE transmits a random access preamble to the BS by a physical random access channel (PRACH) resource. In response to the random access preamble, the BS transmits a random access response message via a downlink-shared channel (DL-SCH). The random access response message includes offset information (i.e., a time advance value) for correcting time synchronization of the UE, uplink radio resource allocation information, index information of the random access preamble received in order to identify UEs performing the random access procedure, and a temporary identifier of the UE. The temporary identifier may be a temporary cell-radio network temporary identity (C-RNTI). Upon receiving the random access response message, the UE corrects time synchronization based on the random access response message, and transmits a scheduling request message including a UE identifier to the BS by the uplink radio resource allocation information. Herein, the UE identifier may be a C-RNTI, an SAE temporary mobile station identifier (S-TMSI), or a random identifier (Id). After transmitting the scheduling request message, the UE starts a contention resolution timer. After receiving the scheduled message, the BS transmits a contention resolution message to the UE by the UE identifier transmitted from the UE. If the contention resolution message is received before the contention resolution timer expires, the UE transmits uplink data.

As described above, the UE transmits a radio resource request message to the BS, and starts a timer. If a radio resource allocation message is received from the BS before the timer expires, uplink data is transmitted by an allocated radio resource. If the radio resource allocation message is not received from the BS until the timer expires, the radio resource request message is retransmitted and the timer is restarted. A timer's expiry time may be a default value defined by a communication standard protocol, or may be a value reported by the BS to the UE by using a higher-layer signal.

If the timer's expiry time is short, the radio resource request message may be unnecessarily retransmitted. On the other hand, if the timer's expiry time is long, it may take a longer time than necessary to retransmit the radio resource request message when the radio resource allocation has failed. Therefore, the timer's expiry time needs to be adaptively set according to a situation. In order to properly set the timer's expiry time, the followings are considered.

First, an uplink load can be considered to set the timer's expiry time. If a large number of UEs simultaneously transmit the radio resource request message to one BS, it may take a lot of time for the BS to allocate a radio resource to each UE. Accordingly, a long time delay may occur until the radio resource allocation message is received after a certain UE transmits the radio resource request message. Therefore, it is preferable that the timer's expiry time is set to be long when the uplink load is high, and the timer's expiry time is set to be short when the uplink load is low.

Next, a priority of traffic can be considered to set the timer's expiry time. For example, a UE having a traffic with a low priority is highly likely to have a relatively low order of radio resource allocation. Therefore, it is preferable that the timer's expiry time of the UE having a traffic with a low priority is set to be long, and the timer's expiry time of the UE having a traffic with a high priority is set to be short.

Next, a time delay requirement of traffic can be considered to set the timer's expiry time. For example, a voice call is a traffic that requires a short time delay, and an electronic mail is a traffic that allows a long time delay. If the timer's expiry time of a UE having a traffic that requires a short time delay is set to be long, a time delay for waiting the radio resource allocation may elapse and thus quality of service (QoS) of traffic may not be satisfied. Therefore, it is preferable that the timer's expiry time of the UE having the traffic that requires a short time delay is set to be short, and the timer's expiry time of the UE having the traffic that requires a long time delay is set to be long.

Next, a relay station can be considered to set the timer's expiry time. That is, if the radio resource request from the UE to the BS passes via the relay station, an additional time delay occurs in the relay station. In addition, if the radio resource request passes via a plurality of relay stations, the time delay is further increased by the number of relay stations. Therefore, it is preferable that the timer's expiry time is set to be long if the radio resource request from the UE to the BS passes via the relay station.

Next, inter-cell cooperation can be considered to set the timer's expiry time. An inter-cell cooperative transmission and reception technique is considered in a next generation wireless communication system to provide services to one or more UEs in cooperation of several BSs. According to the inter-cell cooperative transmission and reception technique, the radio resource request of the UE is received by several BSs, and the several BSs allocate radio resources by performing signal exchange. For example, a time delay required for unidirectional communication between BSs is at least 20 ms in 3GPP. If it is assumed that two cells participate in cooperation, unidirectional communication needs to be performed at least twice between two BSs, and thus a required time delay is at least 40 ms. Therefore, it is preferable that timer's expiry time is set to be longer when using the inter-cell cooperation technique.

Hereinafter, a method of requesting a radio resource and a method of allocating a radio resource will be described according to an embodiment of the present invention.

Figure 8:
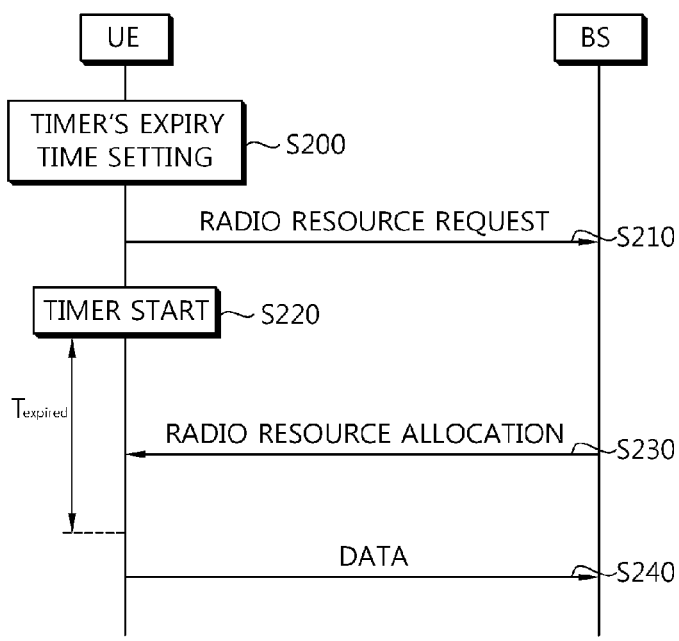
FIG. 8 is a flowchart showing a method of requesting a radio resource according to an embodiment of the present invention.

FIG. 8 is a flowchart showing a method of requesting a radio resource according to an embodiment of the present invention.

Referring to FIG. 8, a UE adaptively sets a timer's expiry time based on a communication state (step S200). The expiry time may be set variably based on the communication state. Herein, the communication state may be determined by an uplink load, a priority of traffic, a time delay requirement of traffic, the number of relay stations existing between the UE and a BS, and inter-cell cooperation, etc.

In this case, the UE may select one suitable time from two or more expiry times by considering a situation. Herein, each timer's expiry time may be a default value defined by a standard, or may be a value reported by the BS to the UE by using a higher-layer signal.

Next, the UE transmits a radio resource request message to the BS (step S210), and starts the timer (step S220). When the UE transmits the radio resource request message, information on the expiry time set in step S200 may be included in the radio resource request message. For example, the UE may transmit the radio resource request message by explicitly specifying the timer's expiry time in the radio resource request message. Alternatively, a bitmap may be used to report which value is selected from pre-defined values or values reported by the BS. In addition, the UE may report a reason of setting the timer's expiry time to the BS by a pre-defined flag bit.

Next, after receiving the radio resource request message, the BS transmits a radio resource allocation message to the UE before the timer expires (step S230).

Next, after receiving the radio resource allocation message, the UE transmits data to the BS by radio resource allocation information included in the radio resource allocation message (step S240). If the UE fails to receive the radio resource allocation message from the BS until the timer expires, the radio resource request message may be retransmitted to the BS.

According to the method of FIG. 8, the UE properly sets the timer's expiry time based on a communication state and reports the expiry time to the BS. Therefore, the radio resource request can be prevented from unnecessary retransmission, and a time delay for requesting and allocating a radio resource can be reduced.

Herein, the UE may comprise a processor and a radio frequency (RF) unit which is connected to the processor and transmits/receives a radio signal. The processor is configured for setting a timer's expiry time, transmitting a radio resource request message to a base station, starting the timer and retransmitting the radio resource request message to the base station if a radio resource allocation message is not received until the timer expires, wherein the expiry time may be set variably based on a communication state.

Figure 9:
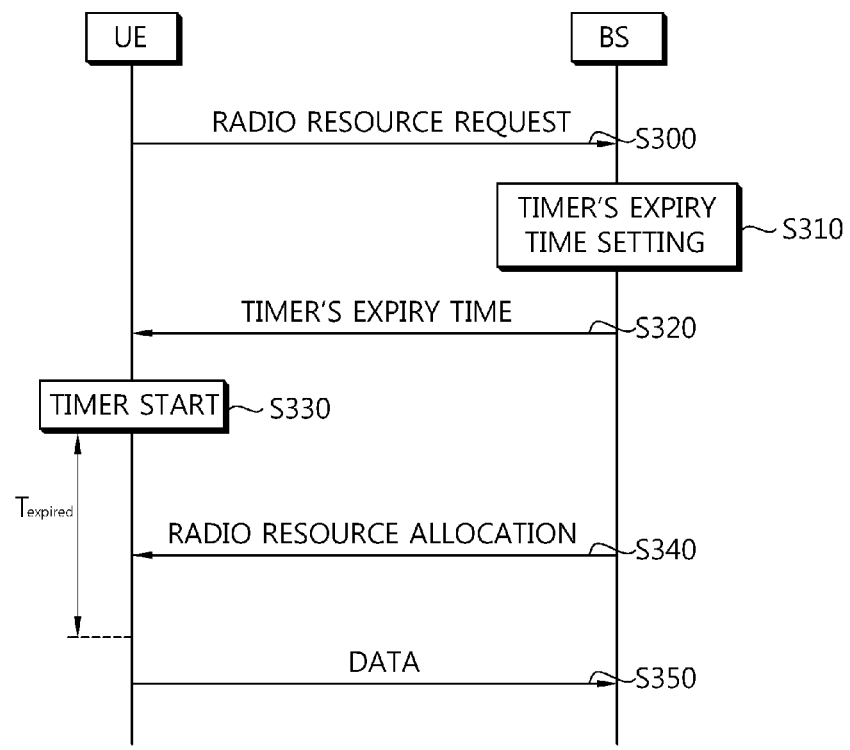
FIG. 9 is a flowchart showing a method of allocating a radio resource according to an embodiment of the present invention.

FIG. 9 is a flowchart showing a method of allocating a radio resource according to an embodiment of the present invention.

Referring to FIG. 9, a BS receives a radio resource request message from a UE (step S300), and adaptively sets a timer's expiry time of the UE (step S310). The BS may adaptively (variably) set the expiry time based on at least one of an uplink load, a priority of traffic, a time delay requirement of traffic, the number of relay stations existing between the UE and the BS, and inter-cell cooperation, etc.

Next, the BS reports the timer's expiry time set in step S310 to the UE (step S320). The UE starts the timer (step S330), and waits for radio resource allocation of the BS. A method of reporting the timer's expiry time from the BS to the UE will be described below in detail.

Next, the BS transmits a radio resource allocation message to the UE before the timer expires (step S340). In this case, the BS may report a reason of setting the timer's expiry time to the UE by using a pre-defined flag bit.

After receiving the radio resource allocation message from the BS, the UE transmits uplink data by information included in the radio resource allocation message (step S350).

Additionally, if the user equipment fails to receive the radio resource allocation message until the timer expire, the user equipment retransmits the radio resource request message.

According to the method of FIG. 9, the BS properly sets the timer's expiry time according to a situation and reports the timer's expiry time to the UE. Therefore, the radio resource request can be prevented from unnecessary retransmission, and a time delay for requesting and allocating a radio resource can be reduced.

Hereinafter, a method of reporting a timer's expiry time from a BS to a UE will be described.

First, the BS may use a bitmap for one of methods of reporting the timer's expiry time to the UE. It is assumed that the UE has two or more expiry times defined by a standard or reported by the BS. The BS may report any one expiry time selected from the two or more expiry times by the bitmap. The bitmap may be expressed by acknowledgement (ACK) of the BS in response to radio resource request of the UE.

After receiving the radio resource request from the UE, the BS transmits ACK/NACK to the UE. To increase transmission reliability of ACK/NACK, a resource capable of transmitting 1 bit or more may be allocated to a channel on which the ACK/NACK is transmitted. For example, a resource capable of transmitting 3 bits can be allocated to a channel on which the ACK/NACK is transmitted, thereby reducing an error probability. That is, an error probability between ACK and NACK can be reduced when the ACK is coded as [1,1,1] and the NACK is coded as [−1,−1,−1].

By such a coding scheme, ACK 1 may be defined as [1,1,1] and ACK 2 may be defined as [1,1,−1]. The ACK 1 may indicate a 1st expiry time and the ACK 2 may indicate a 2nd expiry time.

In another method of reporting the timer's expiry time from the BS to the UE, some of fields included in a radio resource allocation message may be modified. That is, when the BS receives a radio resource request message from the UE, the radio resource allocation message is immediately transmitted, and some of the fields of the radio resource allocation message are modified. In the radio resource allocation message, a field indicating a radio resource location and a field indicating a radio resource amount may be set to a specific value so that the UE can interpret the radio resource allocation message as a timer's expiry time setting message. For example, if the radio resource amount is set to 0, the UE may interpret the radio resource allocation message as the timer's expiry time setting message. In this case, a reason of setting the timer's expiry time or a timer's proper expiry time may be carried in the field indicating the radio resource location.

In still another method of reporting the timer's expiry time by the BS to the UE, an additional message signal may be defined.

Figure 10:
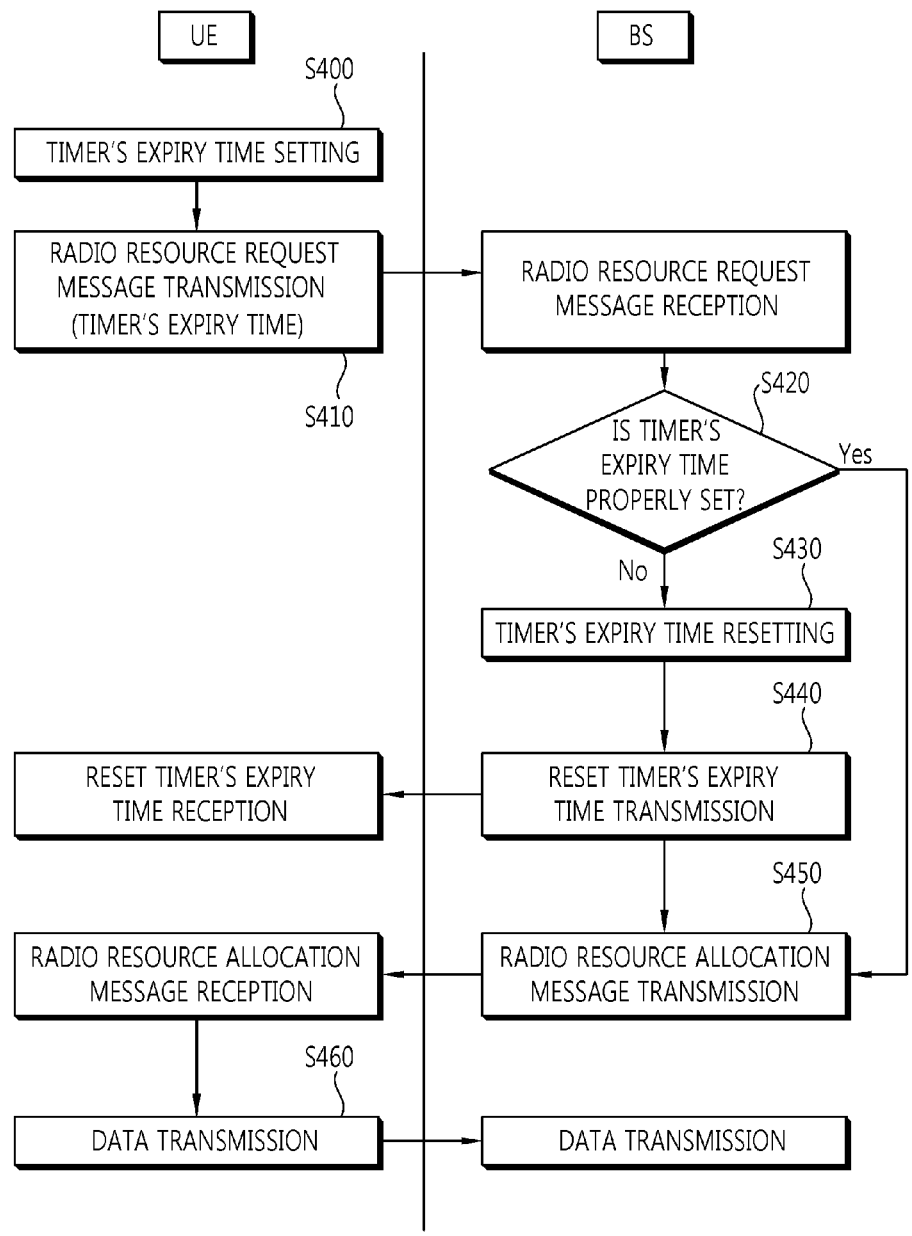
FIG. 10 is a flowchart showing a method of requesting and allocating a radio resource according to an embodiment of the present invention.

FIG. 10 is a flowchart showing a method of requesting and allocating a radio resource according to an embodiment of the present invention.

Referring to FIG. 10, a UE adaptively sets a timer's expiry time (step S400). The UE may variably set the timer's expiry time based on a communication state. The communication state may be at least one of an uplink load, a priority of traffic, a time delay requirement of traffic, the number of relay stations existing between the UE and a BS, and inter-cell cooperation, etc.

In this case, the UE may select one suitable time from two or more timers' expiry times according to a situation. Herein, each timer's expiry time may be a default value defined by a standard, or may be a value reported by the BS to the UE by using a higher-layer signal.

Next, the UE transmits a radio resource request message to the BS, and starts the timer (step S410). When the UE transmits the radio resource request message, information on the timer's expiry timer set in step S400 may be included in the radio resource request message. For example, the UE may transmit the radio resource request message by explicitly specifying the timer's expiry time in the radio resource request message. Alternatively, a bitmap may be used to report which value is selected from pre-defined values or values reported by the BS. In addition, the UE may report a reason of setting the timer's expiry time to the BS by using a pre-defined flag bit.

Next, upon receiving the radio resource request message, the BS determines whether the timer's expiry time is properly set by the UE (step S420).

If the determination result of step 420 shows that the timer's expiry time is not properly set, the BS resets the timer's expiry time (step S430). In this case, the BS may adaptively set the timer's expiry time by considering an uplink load, a priority of traffic, a time delay requirement of traffic, the number of relay stations existing between the UE and the BS, and inter-cell cooperation, etc.

The BS transmits the reset timer's expiry time to the UE (step S440), and transmits a radio resource allocation message to the UE before the timer expires (step S450). A method of transmitting the reset timer's expiry time by the BS to the UE is exemplified in the description of the present invention. If the determination result of step S420 shows that the timer's expiry time is properly set, the BS transmits the radio resource allocation message to the UE before the timer expires (step S450).

After receiving the radio resource allocation message from the BS, the UE transmits uplink data by information included in the radio resource allocation message (step S460).

According to the method of FIG. 10, the BS and the UE can adaptively set the timer's expiry time to reduce a time delay for requesting and allocating a radio resource. In particular, when the BS determines that the UE improperly sets the timer's expiry time, the BS can properly correct the timer's expiry time.

The present invention may be implemented using hardware, software or a combination of them. In the hardware implementation, the present invention may be implemented using an application specific integrated circuit (ASIC), a digital signal processor (DSP), a programmable logic device (PLD), a field programmable gate array (FPGA), a processor, a controller, a microprocessor, other electronic unit or a combination of them, which is implemented and designed to perform the above-described function. In the software implementation, the present invention may be implemented using a module that performs the above-described function. Software may be stored in a memory unit and executed by a processor. A memory unit or a processor may adopt a variety of means that are well known to those skilled in the art.

Although the invention has been described in detail in connection with the preferred embodiments, a person having ordinary skill in the art will appreciate that the invention may be modified in various forms without departing from the spirit and scope of the present invention defined in the appended claims. Accordingly, a change of future embodiments of the present invention may not deviate from the technology of the present invention.

The invention claimed is:

1. A method of requesting a radio resource in a wireless communication system, the method comprising:
    setting, by a user equipment (UE), an expiry time for a timer;
    transmitting, by the UE, a radio resource request message to a base station,
    wherein the radio resource request message includes information explicitly specifying the expiry time,
    wherein the expiry time may be set variably based on a communication state, and
    wherein the communication state is determined by a priority of traffic, a time delay requirement of traffic, an existence of a relay station, and a use of an inter-cell cooperation,
    wherein if the priority of traffic is high, the expiry time is set to "long," otherwise the expiry time is set to "short,"
    wherein if the time delay requirement of traffic is high, the expiry time is set to "long," otherwise the expiry time is set to "short,"
    wherein if the relay station exists, the expiry time is set to "long", otherwise the expiry time is set to "short,"
    wherein if the inter-cell cooperation is used, the expiry time is set to "long," otherwise the expiry time is set to "short,"

wherein the expiry time is selected by the UE from a list of a plurality of expiry times determined according to the communication state;

after receiving the radio resource request message, determining, by the base station, whether the expiry time included in the radio resource request message is properly set;

resetting, by the base station, the expiry time if it is determined that the expiry time is not properly set;

reporting, by the base station, the reset expiry time to the UE, the reset expiry time being reported to the UE when a field indicating a radio resource location and a field indicating a radio resource amount are set to a specific value; and retransmitting, by the UE, the radio resource request message based on the reset expiry time if the UE fails to receive a radio resource allocation message within the reset expiry time.

\* \* \* \* \*